United States Patent
Kato

(10) Patent No.: US 10,321,089 B2
(45) Date of Patent: Jun. 11, 2019

(54) IMAGE PREPRODUCTION APPARATUS, METHOD FOR CONTROLLING THE SAME, AND RECORDING MEDIUM

(71) Applicant: CANON KABUSHIKI KAISHA, Tokyo (JP)

(72) Inventor: Keita Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 15/351,805

(22) Filed: Nov. 15, 2016

(65) Prior Publication Data

US 2017/0140523 A1 May 18, 2017

(30) Foreign Application Priority Data

Nov. 17, 2015 (JP) ................. 2015-225087

(51) Int. Cl.
*G06K 9/32* (2006.01)
*H04N 5/91* (2006.01)
*G06T 7/246* (2017.01)

(52) U.S. Cl.
CPC ............ *H04N 5/91* (2013.01); *G06K 9/3241* (2013.01); *G06T 7/248* (2017.01); *G06K 2209/21* (2013.01); *G06T 2207/10016* (2013.01); *G06T 2207/30196* (2013.01); *G06T 2207/30201* (2013.01)

(58) Field of Classification Search
CPC .......................... G06K 2209/21; G06K 9/3241
See application file for complete search history.

(56) References Cited

U.S. PATENT DOCUMENTS

| 8,649,556 B2 * | 2/2014 | Wedge | G06K 9/00369 382/103 |
| 2004/0125984 A1 * | 7/2004 | Ito | G01S 3/7864 382/103 |
| 2006/0023116 A1 * | 2/2006 | Kunieda | H04N 5/44543 348/441 |
| 2006/0170791 A1 * | 8/2006 | Porter | G06K 9/00295 348/231.3 |
| 2009/0010492 A1 * | 1/2009 | Muramatsu | G02B 7/34 382/103 |

(Continued)

FOREIGN PATENT DOCUMENTS

JP 2014-220724 A 11/2014

*Primary Examiner* — Gandhi Thirugnanam
(74) *Attorney, Agent, or Firm* — Canon U.S.A., Inc. IP Division

(57) ABSTRACT

An image reproduction apparatus includes an obtaining unit that obtains positions of a subject included in a captured moving image for individual frames, a tracking unit that tracks a movement of the subject specified as a tracking target when the moving image is reproduced, and a control unit that controls a display region using the obtained positions of the subject in a case where a difference between a position of the subject specified as the tracking target and the position of the subject obtained by the obtaining unit at a time of image shooting is within a predetermined range, and controls a display region using the position of the subject specified as the tracking target that is tracked by the tracking unit in a reproduction target frame in a case where the difference is not within the predetermined range.

19 Claims, 15 Drawing Sheets

(56) References Cited

U.S. PATENT DOCUMENTS

| | | | |
|---|---|---|---|
| 2009/0016708 A1* | 1/2009 | Takeuchi | G03B 13/36 |
| | | | 396/104 |
| 2009/0052741 A1* | 2/2009 | Abe | G06T 7/223 |
| | | | 382/103 |
| 2009/0238407 A1* | 9/2009 | Tasaki | G06T 7/73 |
| | | | 382/103 |
| 2010/0165113 A1* | 7/2010 | Abe | G06K 9/6203 |
| | | | 348/169 |
| 2012/0020643 A1* | 1/2012 | Kato | G11B 27/034 |
| | | | 386/241 |
| 2012/0062732 A1* | 3/2012 | Marman | H04N 7/18 |
| | | | 348/142 |
| 2013/0162839 A1* | 6/2013 | Yoneyama | H04N 5/23212 |
| | | | 348/169 |
| 2014/0037141 A1* | 2/2014 | Stefanovic | G06K 9/00771 |
| | | | 382/103 |
| 2016/0080650 A1* | 3/2016 | Okazawa | H04N 21/4312 |
| | | | 348/36 |
| 2016/0110604 A1* | 4/2016 | Yoneyama | H04N 5/23212 |
| | | | 382/103 |
| 2017/0140523 A1* | 5/2017 | Kato | G06K 9/3241 |

\* cited by examiner

FIG. 3

| | FRAME NUMBER (301) | SUBJECT ID (302) | SUBJECT COORDINATE (303) | TRACKING PRIORITY (304) |
|---|---|---|---|---|
| 305 | 1 | 1 | (X1, Y1) | 1 |
| 306 | 1 | 2 | (X2, Y2) | 2 |
| | ⋮ | ⋮ | ⋮ | ⋮ |
| 307 | N | 1 | (Xp, Yp) | 1 |
| 308 | N | 2 | (Xq, Yq) | 3 |
| 309 | N | 3 | (Xr, Yr) | 2 |

| TARGET FRAME NUMBER | MAIN SUBJECT ID | TRACKING INFORMATION IDENTIFICATION FLAG | MAIN SUBJECT COORDINATE | MAIN SUBJECT TEMPLATE |
|---|---|---|---|---|
| 30 | 1 | 1 | (1000, 200) |  |

401, 402, 403, 404, 405, 406

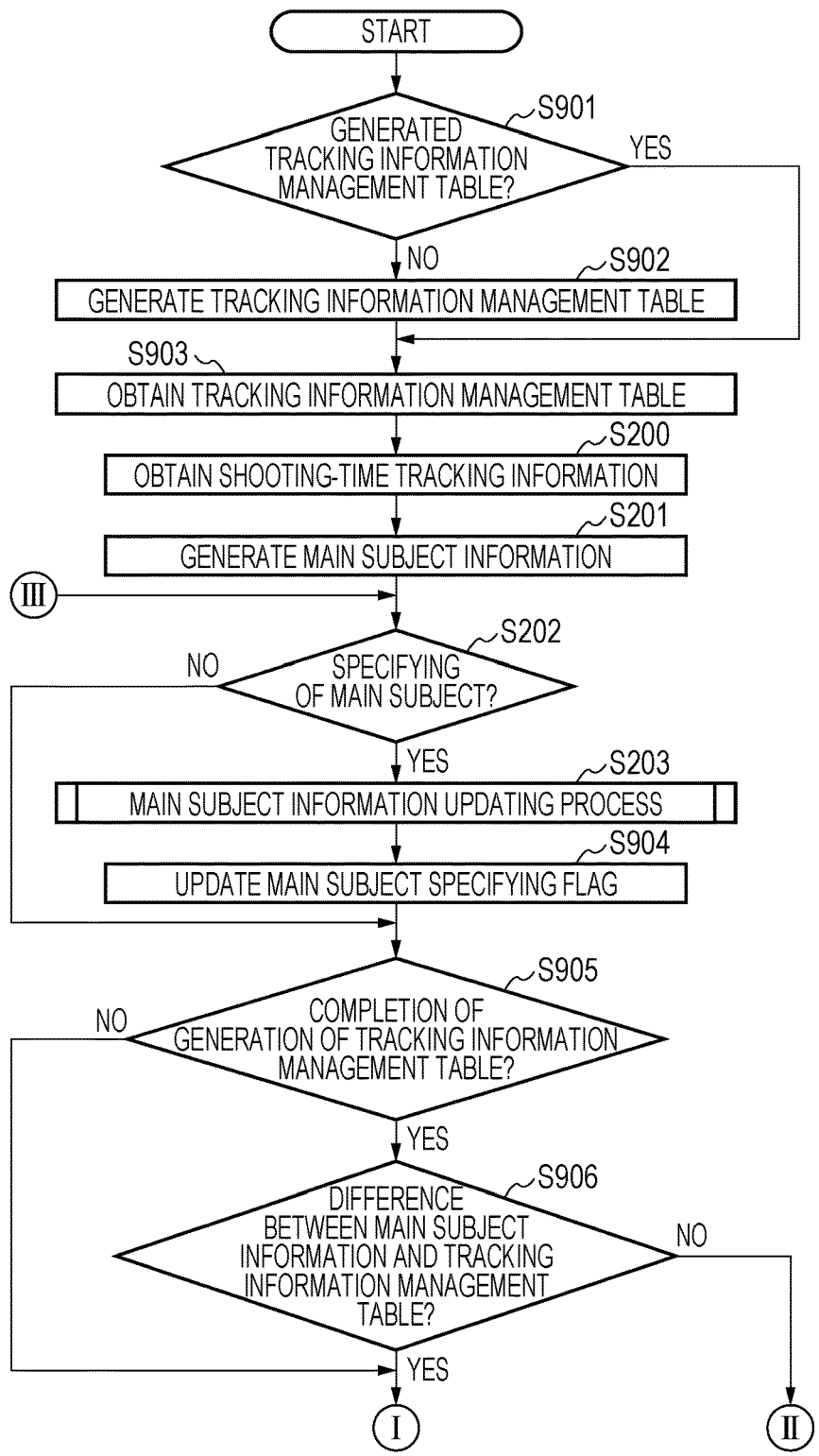

FIG. 10

| FRAME NUMBER | MAIN SUBJECT ID | TRACKING INFORMATION IDENTIFICATION FLAG | MAIN SUBJECT SPECIFYING FLAG | MAIN SUBJECT COORDINATE |
|---|---|---|---|---|
| 1 | 1 | 0 | 0 | -1 |
| 2 | 1 | 0 | 0 | -1 |
| ... | ... | ... | ... | ... |
| 59 | 1 | 1 | 1 | (1000, 500) |
| 60 | 1 | 1 | 0 | (1000, 450) |
| ... | ... | ... | ... | ... |
| N-1 | 2 | 0 | 1 | -1 |
| N | 2 | 0 | 0 | -1 |

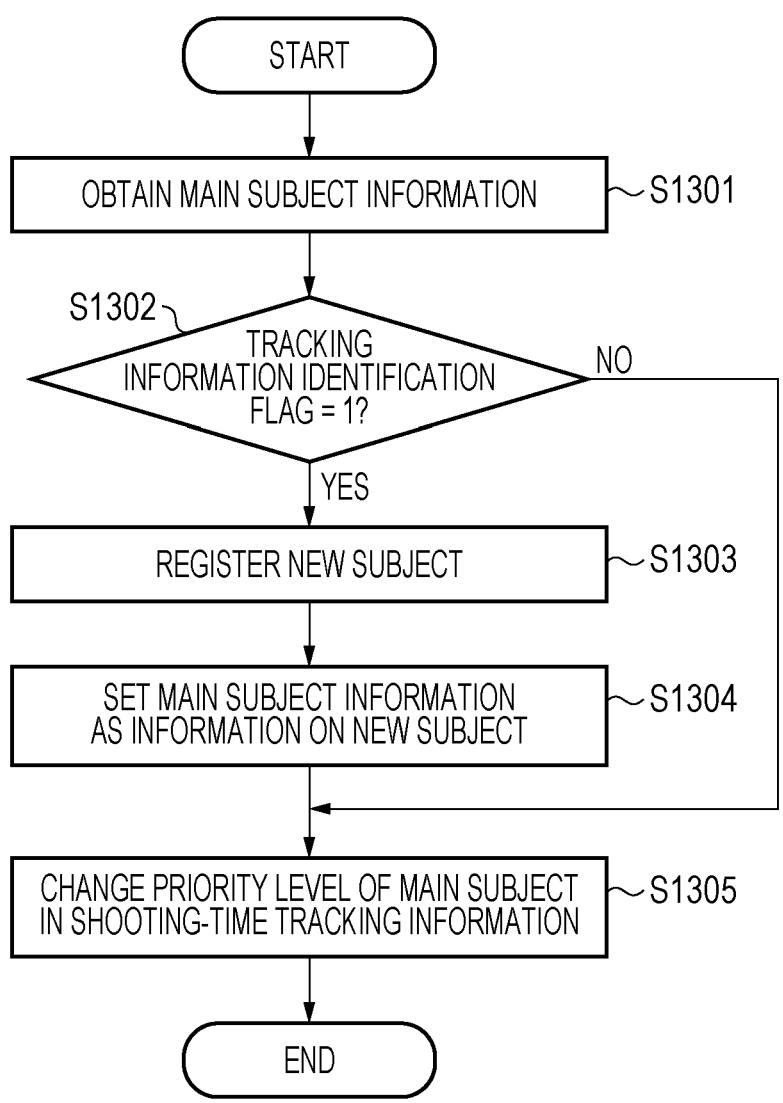

IMAGE PREPRODUCTION APPARATUS, METHOD FOR CONTROLLING THE SAME, AND RECORDING MEDIUM

BACKGROUND

Field

The present disclosure generally relates to an image reproduction apparatus, a method for controlling the image reproduction apparatus, and a recording medium.

Description of the Related Art

Japanese Patent Laid-Open No. 2014-220724 discloses a technique of recording positional information and identification information of individual persons of a plurality of subjects included in a moving image obtained by a wide-angle shot that are detected by a face detection function in advance before reproduction of the moving image and displaying a tracked person using the positional information in reproduction of the moving image.

However, in the technique described above, in a case where a wrong person is tracked due to misrecognition at a time of detection when positional information and the like of a person is recorded in advance, a desired person may not be tracked and displayed at a time of the reproduction of the moving image.

SUMMARY

The present disclosure provides an image reproduction apparatus that reproduces a moving image by appropriately tracking a desired subject even in a case where positional information of the subject recorded before the reproduction is not appropriate, a method for controlling the image reproduction apparatus, a program, and a recording medium.

According to an embodiment of the invention, an image reproduction apparatus includes a processor and a memory configured to store instructions that when executed by the processor as causes the processor to operate as: an obtaining unit configured to obtain positions of a subject included in a captured moving image for individual frames, a tracking unit configured to track a movement of the subject specified as a tracking target when the moving image is reproduced, and a control unit configured to control a display region of the moving image to be displayed using the obtained positions of the subject in a case where a difference between a position of the subject specified as the tracking target and a position of the subject obtained by the obtaining unit at a time of image shooting is within a predetermined range, and control a display region of the moving image to be displayed using the position of the subject specified as the tracking target that is tracked by the tracking unit in a reproduction target frame in a case where the difference is not within the predetermined range.

Further features will become apparent from the following description of exemplary embodiments with reference to the attached drawings.

BRIEF DESCRIPTION OF THE DRAWINGS

FIG. 3 is a diagram illustrating shooting-time tracking information according to the embodiment.

FIGS. 9A and 9B are a flowchart illustrating a series of operations of a reproduction process after updating of the main subject information according to the embodiment.

FIG. 10 is a diagram illustrating data recorded as a tracking information management table according to the embodiment.

FIG. 13 is a flowchart illustrating a series of operations of a process of partially updating shooting-time tracking information according to the embodiment.

DESCRIPTION OF THE EMBODIMENTS

First Embodiment

Hereinafter, exemplary embodiments will be described in detail with reference to the accompanying drawings. The exemplary embodiments are applied to an arbitrary personal computer that reads and reproduces a moving image that serves as an example of an image reproduction apparatus. However, the exemplary embodiments are also applicable to any arbitrary electronic apparatus that reads and reproduces a moving image in addition to a personal computer. Examples of the electronic apparatus include a cellular phone, a game machine, a tablet terminal, a digital still camera, a watch-type or a glasses-type information terminal, a monitoring device, an in-car device, a medical device, etc.

Configuration of Personal Computer

Figure 1:
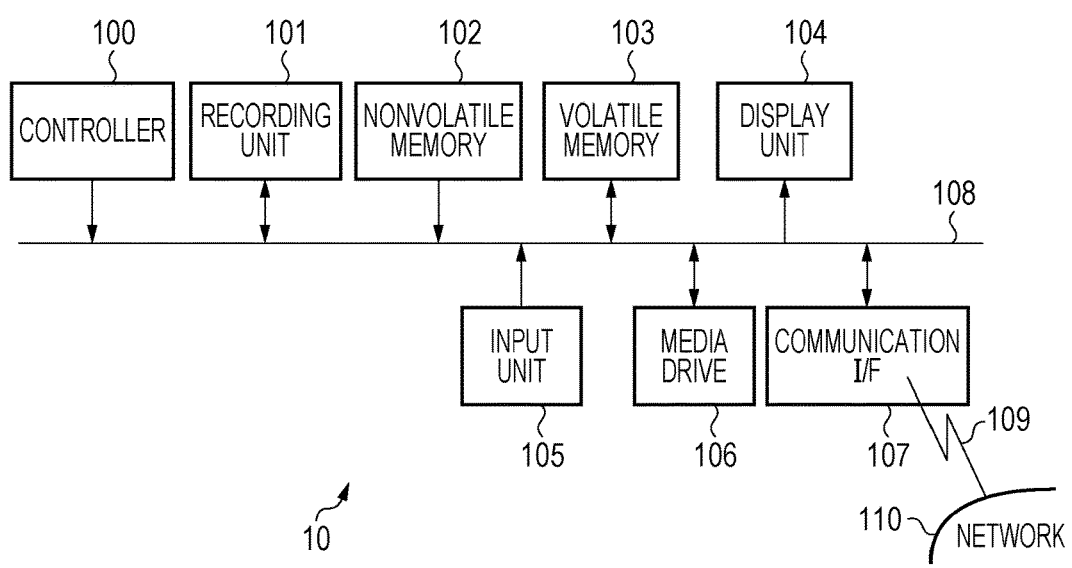
FIG. 1 is a block diagram illustrating a functional configuration of a personal computer which is an example of an image reproduction apparatus according to an embodiment of the invention.

FIG. 1 is a block diagram illustrating a functional configuration of a personal computer 10 according to an embodiment. At least one of functional blocks illustrated in FIG. 1 can be realized by hardware, such as an application specific integrated circuit (ASIC) or a programmable logic array (PLA), or can be realized when a programmable processor, such as a central processing unit (CPU) or a micro processing unit (MPU), executes software. Alternatively, at least one of the functional blocks can be realized by a combination of software and hardware. Accordingly, even in a case where different functional blocks are described as main operation bodies in a description below, the same hardware can be realized as a main body.

In the description below, the image reproduction apparatus performs tracking reproduction using shooting-time tracking information recorded when a moving image is captured, and performs a tracking reproduction process by performing a tracking process at a time of reproduction in a case where a user newly specifies a main subject. The tracking reproduction process in the present embodiment performs reproduction using shooting-time tracking information described in detail below by changing a display scale such that the main subject is displayed.

A controller 100 including a CPU or an MPU copies a program stored in a nonvolatile memory 102 to a volatile memory 103 and executes the program so as to realize a process described below and control the entire personal computer 10.

A recording unit 101 including a recording medium, such as hard disk (HDD) records and reads application programs, data, libraries, etc. Furthermore, the recording unit 101 records and reads moving image data to be processed in a reproduction process described below.

A nonvolatile memory 102 including a nonvolatile storage device, such as a read only memory (ROM), stores a procedure of an operation process of the controller 100, such as a program of a process of activating a computer and a program of a basic input/output process.

The volatile memory 103 including a volatile storage device, such as a RAM, stores moving image data, tracking information, and the like described below and functions as a work area used when the controller 100 executes various processes.

A display unit 104 including a display with a display panel constituted by liquid crystal, LED, or the like displays a captured image, a reproduced image, and a menu image, for example, under control of the controller 100. The display panel included in the display unit 104 can have an arbitrary size in a range from 7 to 27 inches.

An input unit 105 including a pointing device, a keyboard, or a touch panel detects a user operation and transmits information on the user operation to the controller 100.

A media drive 106 including a storage medium attaching unit (a media drive), for example, accepts a detachable storage medium attached thereto and reads data captured by an imaging apparatus, such as a digital still camera or a digital video camera.

A communication interface (I/F) 107 is connected to a computer network 110 through a communication circuit 109. Use of the communication I/F 107 enables transmission and reception of data with communication-available devices.

A system bus 108 including a system bus (an address bus, a data bus, and a control bus) used to connect the units described above to one another controls communication among the units included in the personal computer 10.

Series of Operations of Reproduction process

Figure 2:
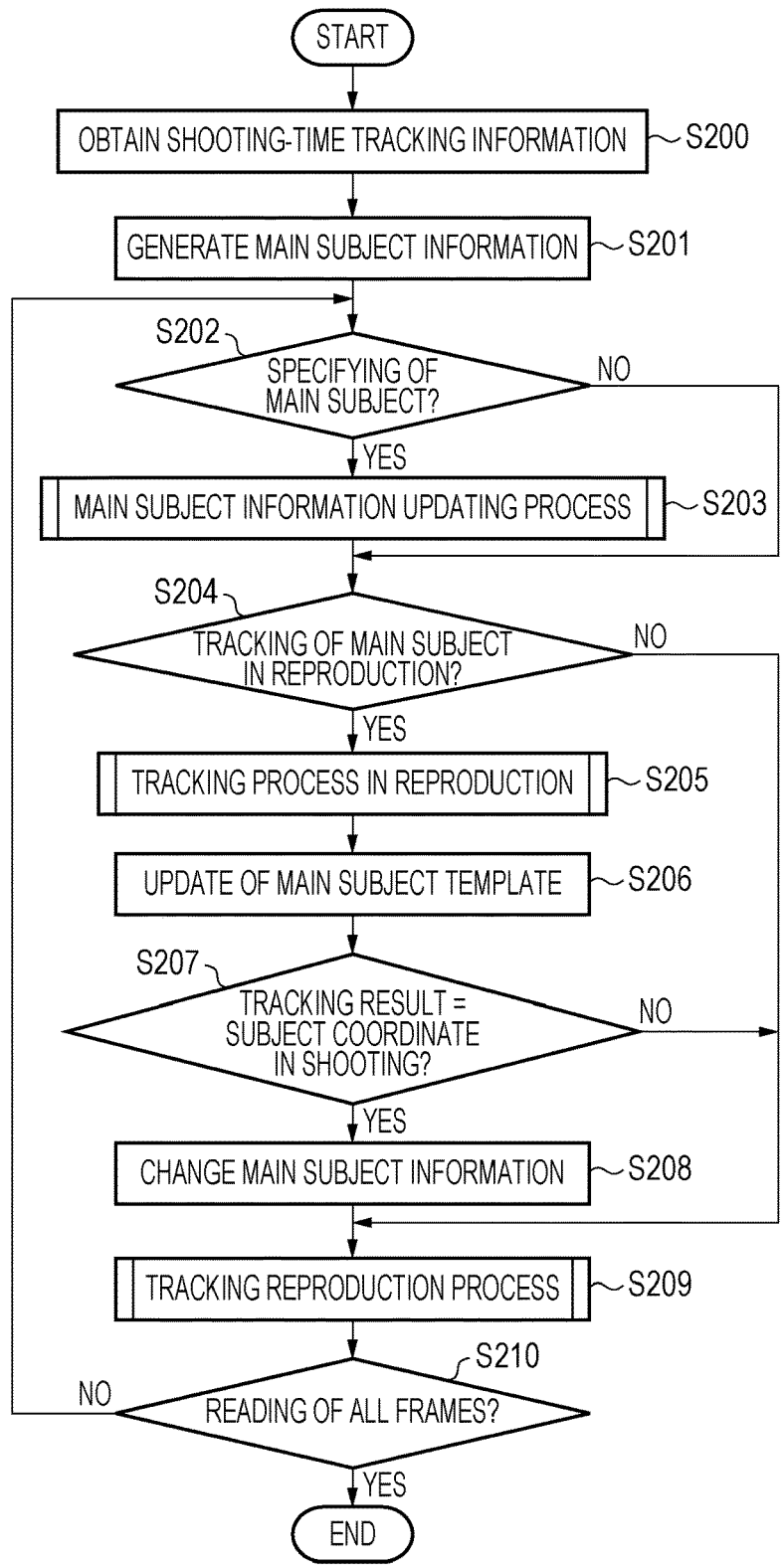
FIG. 2 is a flowchart illustrating a series of operations of a reproduction process according to the embodiment.

Next, a series of operations of a reproduction process performed by the personal computer 10 will be described with reference to FIG. 2. This process is started when the controller 100 detects a reproduction instruction issued by a user operation relative to moving image data to be processed that is recorded in the recording unit 101. This process is realized when the controller 100 copies a program stored in the nonvolatile memory 102 to a working area of the volatile memory 103 and executes the program.

In step S200, the controller 100 obtains shooting-time tracking information. The controller 100 reads recorded shooting-time tracking information associated with moving image data from the recording unit 101. The controller 100 temporarily stores the read shooting-time tracking information in the volatile memory 103, for example. The shooting-time tracking information according to the present embodiment is recorded in a header of a moving image file.

Shooting-Time Tracking Information

The shooting-time tracking information obtained from the moving image file includes data illustrated in FIG. 3, for example. In the example of FIG. 3, the shooting-time tracking information includes data on a frame number, a subject ID, a subject coordinate, and a tracking priority calculated in auto-focus control performed when the moving image file is obtained.

A frame number 301 includes a frame number indicating order of a target frame from a start of image shooting, for example. A subject ID 302 includes an identification number for identifying a subject included in the target frame, for example. A subject coordinate 303 includes information on a coordinate indicating a position of the subject corresponding to the subject ID 302 in the frame. The coordinate of the subject indicates a center coordinate of the detected subject, for example.

A tracking priority 304 is information on tracking priority levels of a plurality of subjects included in the target frame. The smaller a value of the tracking priority 304 is, the higher a priority of a subject corresponding to the subject ID 302 is.

The shooting-time tracking information includes shooting-time subject information items 305 to 309 recorded for individual subjects in individual frames (a frame 1 and a frame N in the example of FIG. 3). The same subject is denoted by the same subject ID.

In step S201, the controller 100 generates main subject information. Specifically, the controller 100 sets data on main subject information described below with reference to the shooting-time tracking information stored in the volatile memory 103 in step S200.

Main Subject Information

Figure 4:
FIG. 4 is a diagram illustrating main subject information according to the embodiment.

The main subject information set based on the shooting-time tracking information includes data illustrated in FIG. 4, for example. The main subject information manages main subject information of a target frame at a time of reproduction and includes data on a target frame number, a main subject ID, a tracking information identification flag, a main subject coordinate, and a main subject template.

A target frame number 401 includes a frame number indicating order of a target frame to be subjected to tracking reproduction, for example. A main subject ID 402 includes a main subject ID indicating an ID of a target subject of the tracking reproduction, for example. A tracking information identification flag 403 includes a flag for recognizing whether a coordinate of a subject indicated by the main subject ID 402 has been calculated by a tracking process performed at a time of image shooting or at a time of reproduction. The flag is set to 0 when the coordinate is calculated at a time of image shooting. The flag is set to 1 when the coordinate is calculated at a time of reproduction.

A main subject coordinate 404 includes a main subject coordinate indicating a position of a subject indicated by the main subject ID 402 in a frame. The main subject coordinate 404 records "−1" indicating no information, for example, in a case where a subject indicated by the main subject ID 402 is not obtained by the tracking process at a time of reproduction.

A main subject template 405 includes image data on a template corresponding to a subject indicated by the main subject ID 402. The image data of the main subject template 405 is used for a template matching process of detecting a subject in image data included in a reproduction-time tracking process described below.

A region of the image data to be stored as the main subject template 405 is represented by Expressions 1 to 4 below. It is assumed that a region of the main subject template 405 is represented by "(TemplateX1, TemplateY1)−(TemplateX2, TemplateY2)". It is also assumed that a width of frames of a moving image is denoted by "W" (pixels), a height thereof is denoted by "H" (pixels), and a coordinate of a main subject specified by a user at a time of reproduction or the subject coordinate 303 is denoted by "(X, Y)". In the present embodiment, an image set as the main subject template 405 has a width and a height of 5.0% of the frame width and the frame height.

$$\text{Template}X1 = X - W \times 0.025 \quad \text{Expression 1}$$

$$\text{Template}Y1 = Y - H \times 0.025 \quad \text{Expression 2}$$

$$\text{Template}X2 = X + W \times 0.025 \quad \text{Expression 3}$$

$$\text{Template}Y2 = Y + H \times 0.025 \quad \text{Expression 4}$$

Main subject information 406 includes information including the target frame number 401 to the main subject template 405 for each frame.

Referring back to FIG. 2, the controller 100 sets a subject ID 302 of a subject having the highest tracking priority level in a leading frame (1, for example) to the main subject ID 402. The controller 100 initializes the tracking information identification flag 403 to 0 (indicating that the coordinate is calculated at a time of image shooting) and the subject coordinate 303 to the main subject coordinate 404 and stores the tracking information identification flag 403 and the subject coordinate 303 in the volatile memory 103 as a file different from the shooting-time tracking information.

In step S202, the controller 100 determines whether the user has specified a main subject at a time of reproduction. In a case where a user operation for specifying a main subject has been input through the input unit 105, the controller 100 determines that the user has specified a main subject and proceeds to step S203. In a case where a main subject has not been specified within a predetermined period of time, the controller 100 determines that a main subject has not been specified and proceeds to step S204. A method for specifying a main subject will be described below with reference to FIG. 8.

When the user specifies a main subject, the controller 100 updates the main subject information stored in the volatile memory 103 in step S203. An updating method will be described below with reference to FIG. 5. For example, the controller 100 updates the tracking information identification flag 403 of the main subject information stored in the volatile memory 103 in accordance with a determination whether a main subject is recorded "at a time of image shooting" or a main subject is specified by the user "at a time of reproduction".

In step S204, the controller 100 determines whether a main subject is to be tracked in reproduction. Specifically, the controller 100 determines whether the main subject is recorded "at a time of image shooting" or specified by the user "at a time of reproduction" with reference to the tracking information identification flag 403 of the main subject information stored in the volatile memory 103. When 0 is set to the tracking information identification flag 403, the controller 100 determines that the main subject is not to be tracked at a time of reproduction and proceeds to step S209. When 1 is set to the tracking information identification flag 403, the controller 100 determines that the main subject is to be tracked at a time of reproduction and proceeds to step S205.

In step S205, the controller 100 performs a reproduction-time tracking process. The controller 100 tracks the main subject using the main subject template 405 of the main subject information stored in the volatile memory 103 and calculates a coordinate of the main subject in the target frame. Thereafter, the main subject coordinate 404 of the main subject information is updated as a result of the tracking on the calculated coordinate. The reproduction-time tracking process will be described below with reference to FIG. 6.

In step S206, the controller 100 updates the main subject template 405 in accordance with a result of the reproduction-time tracking process. Specifically, the controller 100 calculates template information based on the main subject coordinate 404 updated by the reproduction-time tracking process performed in step S205 in accordance with Expressions 1 to 4 and updates the main subject template 405 of the main subject information stored in the volatile memory 103.

In step S207, the controller 100 determines whether the main subject coordinate 404 that is a result of the reproduction-time tracking process is the same as the subject coordinate 303. Specifically, the controller 100 compares the main subject coordinate 404 of the main subject information stored in the volatile memory 103 with the subject coordinate 303 of the shooting-time tracking information to determine whether a difference between the coordinates is within a predetermined range. When the difference between the compared coordinates is within the predetermined range, the controller 100 determines that the main subject coordinate 404 is the same as the subject coordinate 303 and proceeds to step S208. When the difference between the coordinates is larger than the predetermined range, the controller 100 determines that the main subject coordinate 404 is not the same as the subject coordinate 303 and proceeds to step S209.

The controller 100 determines whether Expressions 5 and 6 are both true, for example, to determine whether the difference between the compared coordinates is within the predetermined range. In Expressions 5 and 6, the number of pixels of a width of the frames of the moving image is denoted by "W", the number of pixels of a height thereof is denoted by "H", the main subject coordinate 404 is denoted by "(PlayObjX, PlayObjY), and the subject coordinate 303 of the shooting-time tracking information is denoted by "(RecObjX, RecObjY)".

$$|\text{PlayObj}X - \text{RecObj}X| \le \sqrt{(W \times 0.05) \times (W \times 0.05)} \quad (5)$$

$$|\text{PlayObj}Y - \text{RecObj}Y| \le \sqrt{(H \times 0.05) \times (H \times 0.05)} \quad (6)$$

The predetermined range has a width and a height corresponding to 5.0% of the numbers of pixels of the width and the height of the frames of the moving image, for example.

In step S208, the controller 100 updates the main subject information using the main subject at the time of image shooting. The controller 100 sets −1 indicating no information to the main subject coordinate 404 and the main subject template 405 of the main subject information stored in the volatile memory 103, for example. Thereafter, the main subject ID 402 is updated using the subject ID 302 of the shooting-time tracking information determined that the difference is within the predetermined range in step S207. Furthermore, the controller 100 sets 0 to the tracking information identification flag 403.

In step S209, the controller 100 performs tracking reproduction with reference to the main subject information stored in the volatile memory 103. The tracking reproduction process will be described below with reference to FIG. 7.

In step S210, the controller 100 determines whether all frames in the moving image data have been read to determine whether the tracking reproduction process is to be continuously performed on another frame. The controller 100 compares the target frame number 401 of the main subject information stored in the volatile memory 103 with the total number of frames of the moving image data to determine whether the tracking reproduction has been performed on all the frames. When a frame number indicated by the target frame number 401 does not match the total number of frames of the moving image data, the controller 100 determines that at least one of all the frames has not been subjected to the tracking reproduction and returns to step S202. When the frame number indicated by the target frame number 401 matches the total number of frames of the moving image data, the controller 100 determines that the tracking reproduction has been performed on all the frames and terminates the series of operations.

Series of Operations of Process of Updating Main Subject Information

Figure 5:
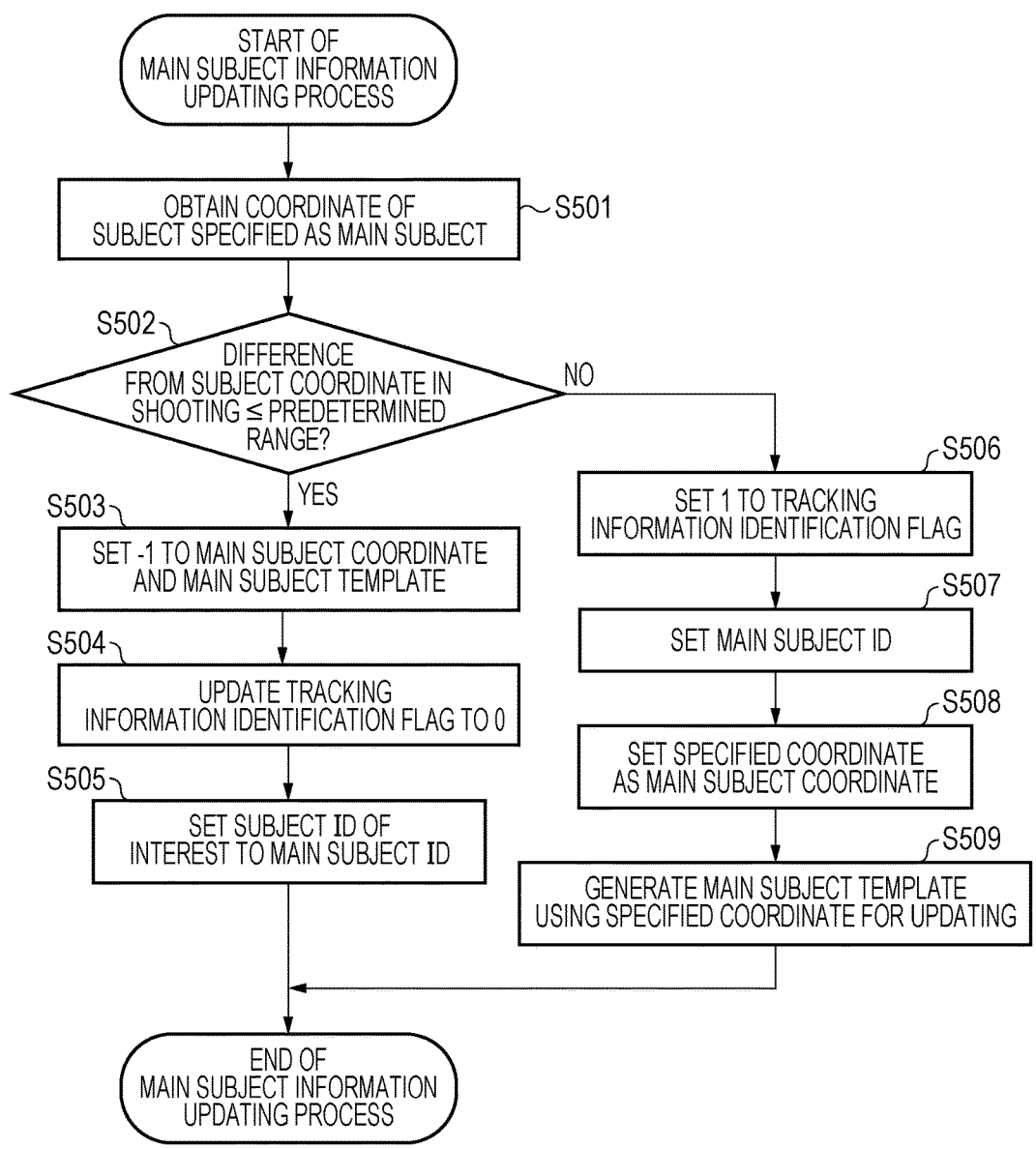
FIG. 5 is a flowchart illustrating a series of operations of a process of updating the main subject information according to the embodiment.

FIG. 5 is a flowchart illustrating a series of operations of the process of updating the main subject information according to the embodiment. This process is executed when the controller 100 starts the process in step S203. The process is operated when the controller 100 executes a control program stored in the volatile memory 103. The process is executed when it is determined that a main subject has been specified by a user operation in step S202, and the controller 100 updates the main subject information in accordance with a result of a determination whether the specified main subject is a shooting-time subject.

In step S501, the controller 100 obtains a coordinate of the subject specified by the user as a main subject in step S202. In step S502, the controller 100 determines whether a difference between the coordinate specifying the main subject obtained in step S501 and the subject coordinate 303 of the shooting-time tracking information stored in the volatile memory 103 is within a predetermined range. The controller 100 determines whether Expressions 5 and 6 are both true to determine whether the difference between the compared coordinates is within the predetermined range. When the determination is affirmative in step S502, that is, when the specified main subject is determined as a shooting-time subject, the controller 100 proceeds to step S503. When the determination is negative in step S502, that is, when the specified main subject is not determined as the shooting-time subject, the controller 100 proceeds to step S506.

In step S503, the controller 100 sets −1 indicating no information, for example, to the main subject coordinate 404 and the main subject template 405 of the main subject information stored in the volatile memory 103. In step S504, the controller 100 changes the tracking information identification flag 403 of the main subject information stored in the volatile memory 103 to 0 indicating that the subject is obtained at the time of image shooting. In step S505, the controller 100 updates the main subject ID 402 of the main subject information stored in the volatile memory 103 by the subject ID 302 of the shooting-time tracking information corresponding to the subject coordinate 303 that is determined that the difference is within the predetermined range.

Steps described below are performed when a difference between the coordinate of the main subject specified in step S501 and the coordinate of the shooting-time subject is larger than the predetermined range. In step S506, the controller 100 changes the value of the tracking information identification flag 403 of the main subject information stored in the volatile memory 103 to 1 indicating that the subject is obtained in reproduction.

In step S507, the controller 100 sets the main subject ID 402 of the main subject information stored in the volatile memory 103 as a new subject ID. In the present embodiment, a value obtained by incrementing the largest value in values of the subject ID 302 of the shooting-time tracking information by one is set.

In step S508, the controller 100 updates the main subject coordinate 404 of the main subject information stored in the volatile memory 103 by the specified coordinate obtained in step S501. In step S509, the controller 100 generates image data using the specified coordinate obtained in step S501 and updates the main subject template 405 of the main subject information stored in the volatile memory 103. The controller 100 calculates the main subject template 405 using Expressions 1 to 4 described above, for example. When terminating the update of the main subject coordinate 404 of the main subject information, the controller 100 terminates the series of operations of this process, and the process returns to a caller, that is, the process proceeds to step S204.

Series of Operations of Reproduction-Time Tracking Process

Figure 6:
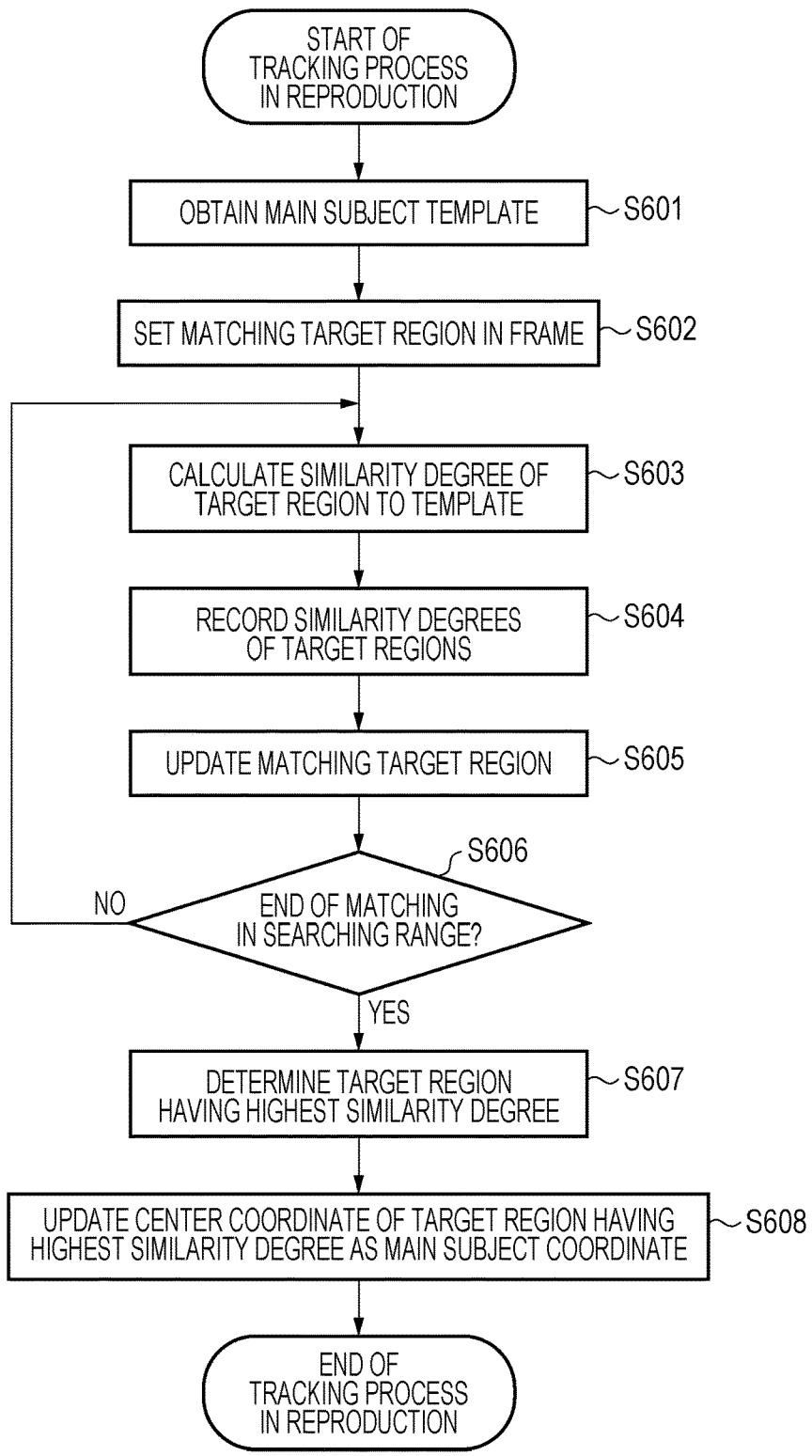
FIG. 6 is a flowchart illustrating a series of operations of a reproduction-time tracking process according to the embodiment.

FIG. 6 is a flowchart illustrating a series of operations of the reproduction-time tracking process according to the embodiment. This process is executed when the controller 100 starts the process in step S205. The process is executed when the controller 100 executes a control program stored in the volatile memory 103. The process is executed when 1 is set to the tracking information identification flag 403 as described above.

In step S601, the controller 100 obtains the main subject template of the main subject information stored in the volatile memory 103. In step S602, the controller 100 sets a target region included in a frame which matches the main subject template of the main subject information stored in the volatile memory 103. The controller 100 determines the target region in accordance with Expressions 7 to 10, for example. In Expressions 7 to 10, a search range for the matching is denoted by "(SearchX1, SearchY1)–(SearchX2, SearchY2)", the number of pixels of the width of the frames included in the moving image is denoted by "W", the number of pixels of the height thereof is denoted by "H", and the main subject coordinate 404 is denoted by (X, Y).

$$SearchX1 = X - W \times 0.05 \qquad \text{Expression 7}$$

$$SearchY1 = Y - H \times 0.05 \qquad \text{Expression 8}$$

$$SearchX2 = X + W \times 0.05 \qquad \text{Expression 9}$$

$$SearchY2 = Y + H \times 0.05 \qquad \text{Expression 10}$$

The search range has a width and a height of 10.0% of the numbers of pixels of the width and the height of the frames of the moving image, for example.

The controller 100 calculates the matching target region in accordance with Expressions 11 to 14, for example. In Expressions 11 to 14, an initial value of a center coordinate (X2, Y2) corresponds to the coordinate (SearchX1, SearchY1) described above. Furthermore, the matching target range is denoted by "(TargetX1, TargetY1)–(TargetX2, TargetY2), the number of pixels of the width of the frames included in the moving image is denoted by "W", and the number of pixels of the height thereof is denoted by "H".

$$TargetX1 = X2 - W \times 0.025 \qquad \text{Expression 11}$$

$$TargetY1 = Y2 - H \times 0.025 \qquad \text{Expression 12}$$

$$TargetX2 = X2 + W \times 0.025 \qquad \text{Expression 13}$$

$$TargetY2 = Y2 + H \times 0.025 \qquad \text{Expression 14}$$

The matching target region has a width and a height of 5.0% of the numbers of pixels of the width and the height of the frames, for example.

In step S603, the controller 100 calculates a degree of similarity between the main subject template 405 of the main subject information stored in the volatile memory 103 and the target region set in step S602. The controller 100 determines a region having the smallest sum of absolute difference (SAD) that is a sum of absolute values of differences between density values of the template and the target region and the smallest sum of square difference (SSD) that is a sum of square of the differences as a region having a high similarity degree. In Expressions 15 and 16, the template is denoted by "F(i, j)" an input image is denoted by "G(i, j)", and a scanning position is denoted by (dx, dy).

$$SAD(dx,dy)=\Sigma\Sigma|G(dx+i,dy+j)-F(i,j)| \quad (15)$$

$$SSD(dx,dy)=\Sigma\Sigma(G(dx+i,dy+j)-F(i,j))\times(G(dx+i,dy+j)-F(i,j)) \quad (16)$$

The controller 100 stores the obtained SAD and SSD in the volatile memory 103 as similarity degrees in step S604.

In step S605, the controller 100 changes X and Y coordinates of the center coordinate (X2, Y2) of the target region described above such that all pixels in the search range illustrated with reference to Expressions 7 to 10 successively serve as the center coordinate. In step S606, the personal computer 10 determines whether the matching is performed on the entire search range of the target frame. When the determination is affirmative, the process proceeds to step S607. When the determination is negative, the process returns to step S603 where the matching is performed on a remaining portion in the search range.

In step S607, the controller 100 determines a target region having the highest similarity degree with reference to the similarity degrees stored in the volatile memory 103 in step S604. In step S608, the controller 100 calculates a center coordinate based on the target region having the highest similarity degree calculated in step S607 and updates the main subject coordinate 404 of the main subject information stored in the volatile memory 103 by the calculated coordinate. After updating the main subject coordinate 404 of the main subject information, the controller 100 terminates the series of operations of this process, and the process is returned to a caller, that is, the process proceeds to step S206.

Series of Operations of Tracking Reproduction Process

Figure 7:
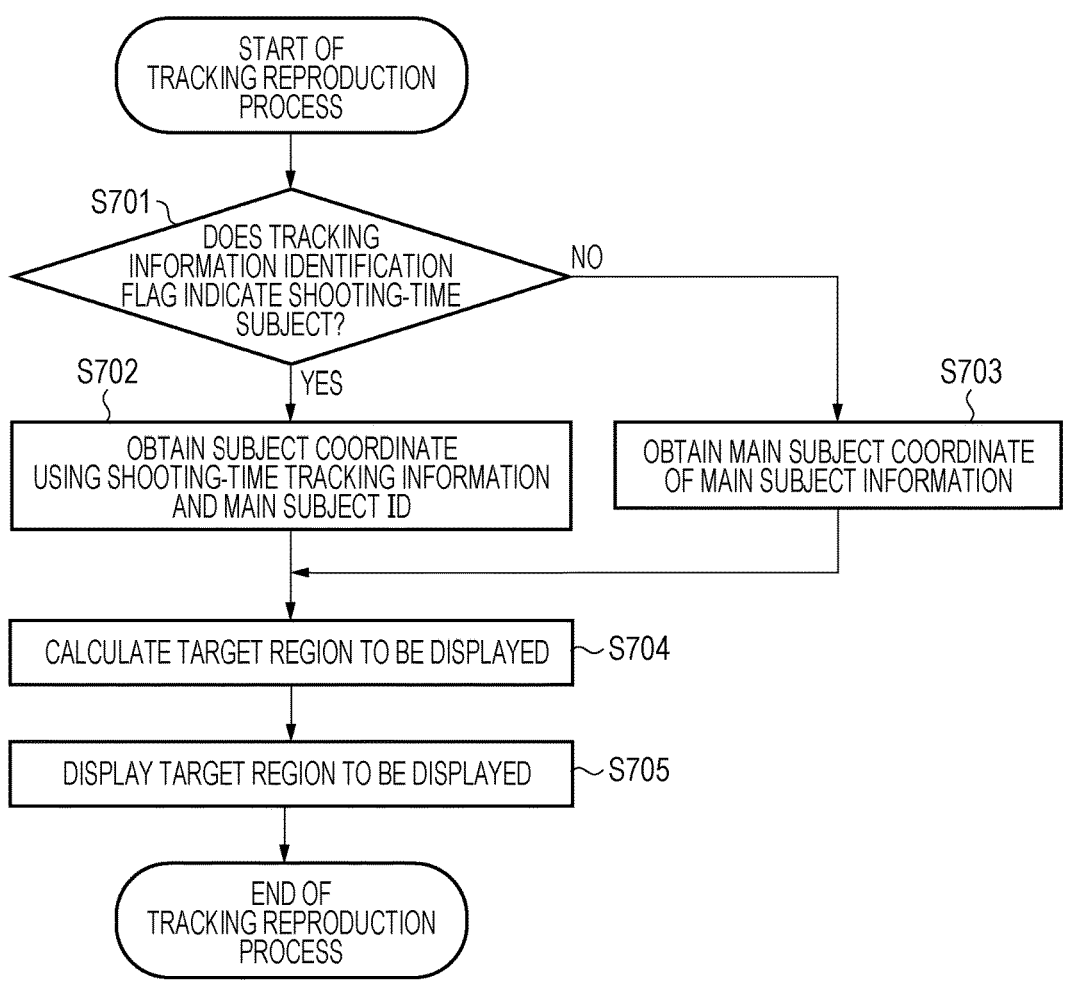
FIG. 7 is a flowchart illustrating a series of operations of a tracking reproduction process according to the embodiment.

FIG. 7 is a flowchart illustrating a series of operations of the tracking reproduction process. This process is executed when the controller 100 starts the process in step S209. The process is executed when the controller 100 executes a control program stored in the volatile memory 103.

In step S701, the controller 100 determines whether the main subject is a shooting-time subject. Specifically, the controller 100 determines whether a value of the tracking information identification flag 403 of the main subject information stored in the volatile memory 103 is 0 indicating a shooting-time subject. When 0 indicating a shooting-time subject is set to the tracking information identification flag 403, the controller 100 proceeds to step S702. When 1 indicating a reproduction-time subject is set to the tracking information identification flag 403, the controller 100 proceeds to step S703.

In step S703, the controller 100 obtains a coordinate to be used in tracking reproduction in accordance with the main subject ID 402 of the main subject information and the corresponding subject coordinate 303 of the shooting-time tracking information in the frame number 301 that is the same as the target frame number 401. When the main subject is not a shooting-time subject, the controller 100 obtains a coordinate for tracking reproduction in accordance with the main subject coordinate 404 of the main subject information stored in the volatile memory 103 in step S703.

In step S704, the controller 100 calculates a target region (a tracking reproduction target region) to be displayed in the target frame using the coordinate of the subject obtained in step S702 or step S703. The controller 100 calculates a tracking reproduction target region in accordance with Expressions 17 to 20 such that the coordinate of the main subject obtained in step S702 or step S703 is positioned at a center of the target region. It is assumed that, in Expressions 17 to 20, the tracking reproduction target region is denoted by "(PlayAreaX1, PlayAreaY1)–(PlayAreaX2, PlayAreaY2)". It is also assumed that the obtained coordinate is denoted by "(X, Y)", a specified scale is denoted by "Z", the number of pixels of the width of the frames of the moving image is denoted by "W", and the number of pixels of the height thereof is denoted by "H".

$$PlayAreaX1=X-(W/Z)/2 \quad \text{Expression 17}$$

$$PlayAreaY1=Y-(H/Z)/2 \quad \text{Expression 18}$$

$$PlayAreaX2=X+(W/Z)/2 \quad \text{Expression 19}$$

$$PlayAreaY2=Y+(H/Z)/2 \quad \text{Expression 20}$$

When one pixel of the frames of the moving image corresponds to one pixel of the display unit 104 at a time of output, 1 is set to the specified scale Z. When two square pixels of the frames of the moving image corresponds to one pixel at the time of output 0.5 is set, and 2 is set when one pixel of the frames of the moving image corresponds to two square pixels at the time of output. A method for specifying a scale will be described below with reference to FIG. 8.

Figure 8:
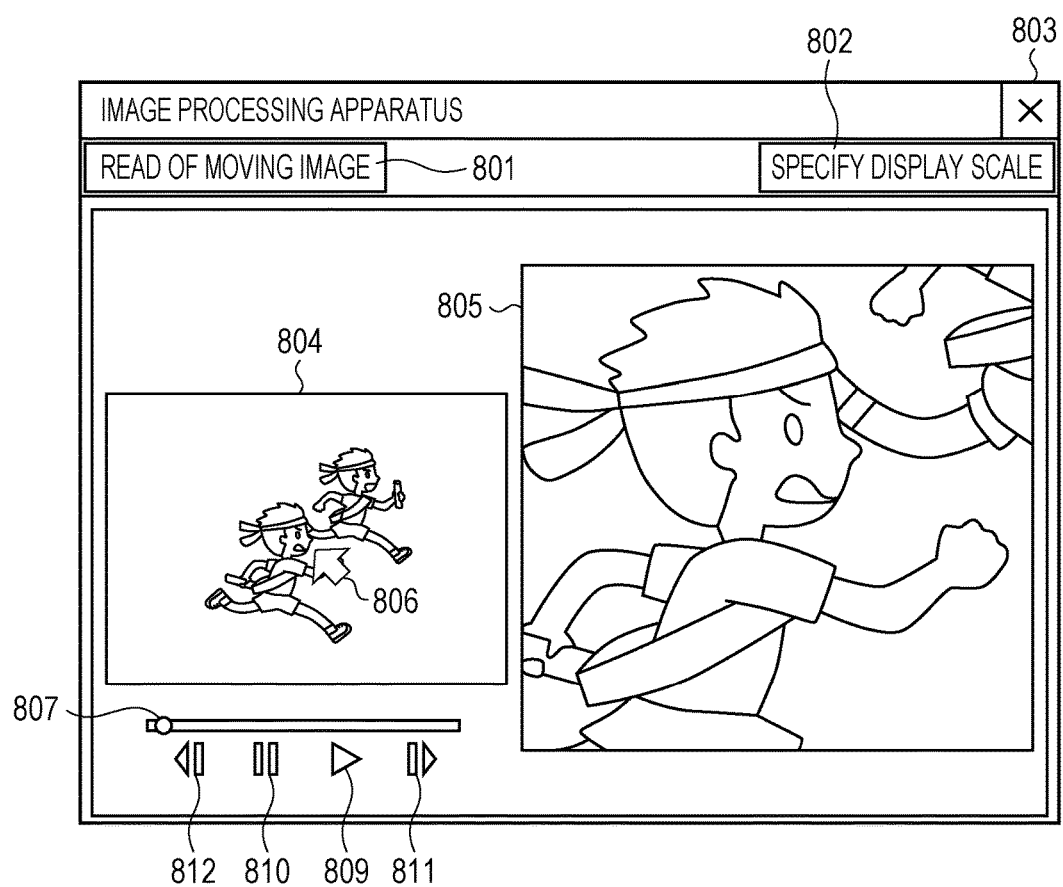
FIG. 8 is a diagram schematically illustrating a user interface in an input unit according to the embodiment.

In step S705, the controller 100 changes a scale of the target region to be displayed which is calculated in step S704 in accordance with the specified scale and displays the target region in the display unit 104. User Interface of Tracking Reproduction Process FIG. 8 is a diagram schematically illustrating a user interface (UI) displayed in the display unit 104. An example of a method for specifying a main subject performed by the user at a time of reproduction of the moving image data will be described. In the example of FIG. 8, an entire region of a frame included in the moving image and a tracking reproduction target region are both displayed in the display unit 104 when the tracking reproduction process is to be performed.

When a moving image reading button 801 is pressed, reading of a file of the moving image data is started. For example, when the user presses the moving image reading button 801 using a pointing device included in the input unit 105, the controller 100 determines that an instruction for reading the moving image data has been issued and displays an open dialogue for opening the file of the moving image data. In a case where the user selects the moving image data in the open dialogue, the controller 100 reads the selected moving image data from the recording unit 101 to the volatile memory 103 and displays the moving image data in the display unit 104.

A display scale specifying list box 802 is a list box for selection used to specify a display scale of the predetermined region of the frame of the moving image. When the user selects the display scale specifying list box 802, the controller 100 determines that a scale designation instruction has been issued and displays a display scale list. Examples of scales listed in the display scale list include 25%, 50%, 100%, 200%, and 400%. In a case where the user selects 100%, for example, the controller 100 specifies 1 as the specified scale so that one pixel of a frame included in the moving image corresponds to one pixel of the display panel. In a case where the user selects 50%, for example, the controller 100 specifies 0.5 as the specified scale so that two square pixels of a frame included in the moving image corresponds to one pixel of the display panel. In a case where the user selects 200%, for example, the controller 100 designates 2 as the specified scale so that one pixel of a frame included in the moving image corresponds to two square pixels at a time of output. The controller 100 stores the specified scale corresponding to a scale designated by the user in the volatile memory 103.

An end button 803 is used to terminate reproduction of the moving image data. When the user presses the end button 803 using the input unit 105, the controller 100 determines that an end instruction has been issued and terminates the reproduction of the moving image data.

An entire display area 804 displays an entire frame of the moving image corresponding to the read moving image data. The user can specify a subject by specifying a certain position on the entire display area 804, and the controller 100 determines that an operation for specifying a main subject has been performed and stores a coordinate of the specified position in the volatile memory 103. Note that a frame clearly indicating a region selected as a tracking reproduction target region can be displayed in the entire display area 804. In this way, the user can easily recognize a region that is being tracked in the frame of the moving image and can easily determine whether the tracking target is to be changed to another subject.

A tracking display area 805 displays the calculated tracking reproduction target region in a frame of the moving image in step S705. The tracking display area 805 controls a display region so that the display region includes a main subject. A cursor 806 indicates a position of a pointing device specified by the user. A seeking bar 807 is a member that can be slid and which is included in the input unit 105. When the user presses or slides the seeking bar 807, the controller 100 changes a reproduction position of the moving image data on a time axis.

Reference numerals 809 to 812 are buttons that specify a method for reproducing the moving image data and a reproduction position. When the reproduction button 809 is pressed using the cursor 806, the tracking reproduction is started. When the pause button 810 is pressed using the cursor 806, the tracking reproduction is temporarily stopped. When the frame feed button 811 is pressed using the cursor 806, the tracking reproduction is temporarily stopped and a next frame is displayed in the entire display area 804. When the frame return button 812 is pressed using the cursor 806, the tracking reproduction is temporarily stopped and a preceding frame is displayed in the entire display area 804.

Series of Operations of Reproduction Process After Update of Main Subject Information Next, a series of operations of a reproduction process performed in a state in which the main subject information is updated by the tracking reproduction process will be described with reference to FIGS. 9A and 9B.

First, an example of a tracking information management table according to the present embodiment will be described. The tracking information management table includes a frame number 1001, a main subject ID 1002, a tracking information identification flag 1003, a main subject specifying flag 1004, and a main subject coordinate 1005, for example. The controller 100 generates data on the tracking information management table based on the main subject information stored in the volatile memory 103.

The frame number 1001 indicates order of a target frame from a start of the tracking reproduction, for example. The main subject ID 1002 indicates identification information for identifying a target subject of the tracking reproduction. The tracking information identification flag 1003 indicates information for identifying whether a subject indicated by the main subject ID 1002 is calculated by a tracking process at a time of image shooting or at a time of reproduction. In the present embodiment, the controller 100 sets 0 in a case where the subject is calculated "at a time of image shooting" and sets 1 in a case where the subject is calculated "at a time of reproduction". The main subject specifying flag 1004 indicates whether a main subject has been specified in a target frame. In the present embodiment, when a main subject is "specified", the controller 100 set 1 whereas when a target subject is "not specified", the controller 100 sets 0.

The main subject coordinate 1005 indicates a coordinate of a position of a subject indicated by the main subject ID 1002 in a frame. In a case where a subject indicated by the main subject ID 1002 is calculated by a tracking process at a time of image shooting, −1 indicating no information is set to the main subject coordinate 1005. Reference numerals 1006 to 1011 denote examples of data elements included in the tracking information management table.

Figure 9B:
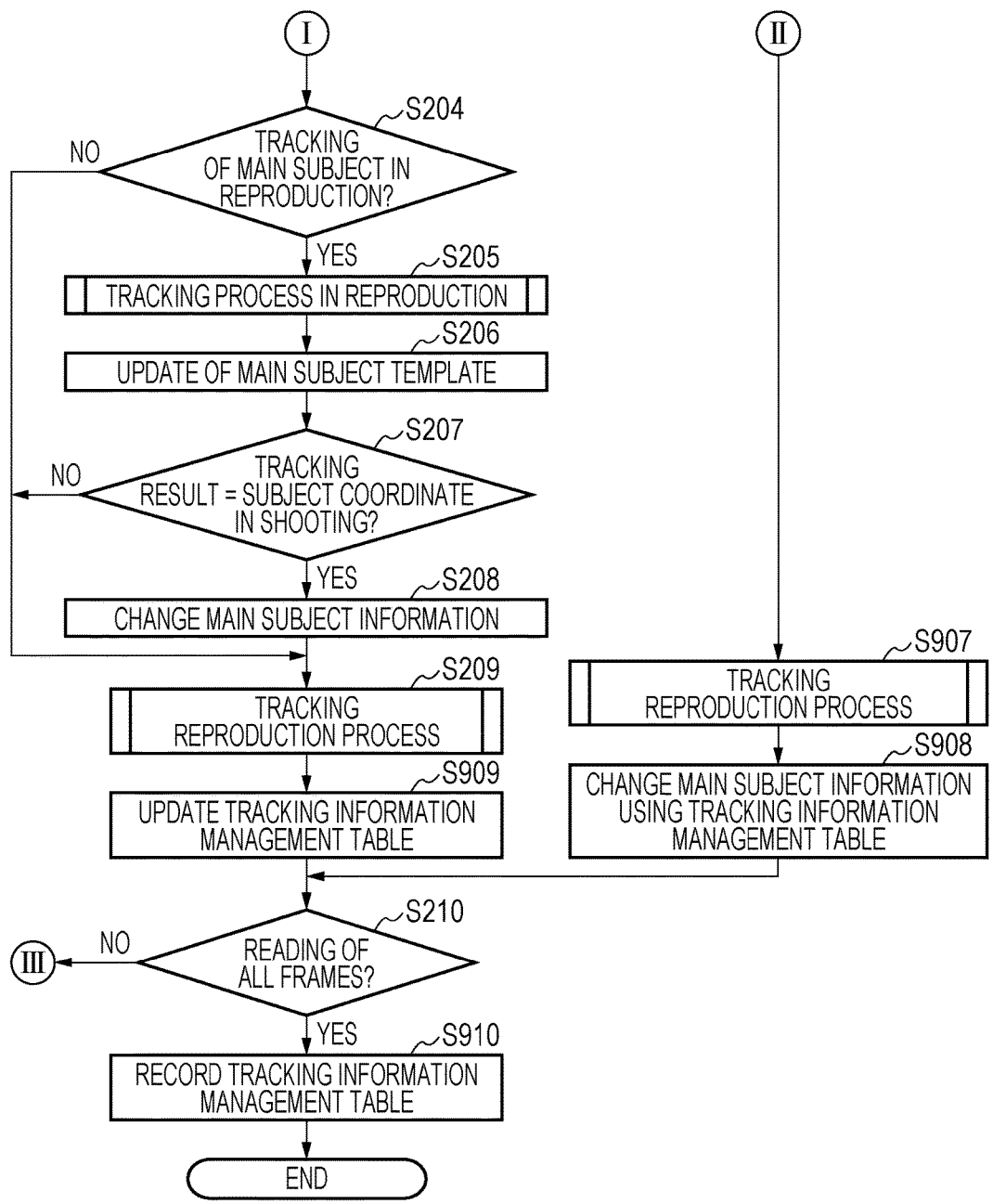

The tracking reproduction process illustrated in FIGS. 9A and 9B can be performed with reference to the main subject information stored in the volatile memory 103, since the tracking reproduction process has been executed at least once. Therefore, the controller 100 generates the tracking information management table as data different from the shooting-time tracking information in accordance with the main subject information. Then, in the tracking reproduction process performed for the second time onwards, the tracking reproduction process is performed using the tracking information management table. In FIGS. 9A and 9B, operations the same as those in the tracking reproduction process described above are denoted by reference numerals the same as those in the tracking reproduction process described above so that redundant descriptions are omitted.

In step S901, the controller 100 determines whether a tracking information management table has been generated in the recording unit 101. For example, in a case where a predetermined file name indicating a tracking information management table is included in the recording unit 101, the controller 100 determines that a tracking information management table has been generated. When determining that a tracking information management table has been generated, the controller 100 proceeds to step S903, otherwise, the controller 100 proceeds to step S902.

In step S902, the controller 100 generates data of the tracking information management table in the recording unit 101 and initializes the data. Specifically, the controller 100 generates a file of the tracking information management table, and thereafter, sets −1 indicating "no information" to rows of the data corresponding to a number of frames of the target moving image.

In step S903, the controller 100 opens the file of the tracking information management table stored in the recording unit 101 and reads the data to the volatile memory 103. Thereafter, the controller 100 executes the process from step S200 to step S203 described with reference to FIG. 2.

In step S904, the controller 100 updates a value of the main subject specifying flag 1004 of the target frame in the data of the tracking information management table stored in the volatile memory 103 to 1 indicating that "a main subject has been specified". After completing the process on data in all the frames included in the tracking information management table, the controller 100 writes the data of the volatile memory 103 into the recording unit 101.

In step S905, the controller 100 determines whether the generation of the tracking information management table has been completed. For example, the controller 100 determines whether "−1" indicating "no information" is not included in the frame number 1001 to the main subject coordinate 1005 of all the frames in the tracking information management table recorded in the recording unit 101. When determining that the generation of the tracking information management table has been completed, the controller 100 proceeds to step S906, otherwise, the controller 100 proceeds to step S204.

In step S906, the controller 100 determines whether the data in the tracking information management table stored in the volatile memory 103 is different from the data of the target frame included in the main subject information stored in the volatile memory 103. The controller 100 compares corresponding elements of data in the target frame number 401 and the frame number 1001 that indicate the same number, for example. Specifically, the controller 100 compares the main subject ID 402 with the main subject ID 1002, the tracking information identification flag 403 with the tracking information identification flag 1003, and the main subject coordinate 404 with the main subject coordinate 1005. When determining that the data in the tracking information management table is different from the data of the target frame in the main subject information, the controller 100 proceeds to step S204, otherwise, the controller 100 proceeds to step S907. The controller 100 also executes a process from step S204 to step S209 described with reference to FIG. 2. As with step S209, the controller 100 executes the tracking reproduction process in step S907.

In step S908, the controller 100 changes the main subject information stored in the volatile memory 103 using the data included in the tracking information management table stored in the volatile memory 103. For example, the controller 100 increments the target frame number 401 of the main subject information to obtain a next frame number, and sets values of data (1002, 1003, and 1005) corresponding to the frame number obtained after the incrementing as values of data (402 to 404) of the main subject information.

In step S909, the controller 100 updates the tracking information management table. The controller 100 updates corresponding elements of data in which the target frame number 401 and the frame number 1001 indicate the same number, for example. The controller 100 writes the main subject ID 402 into the main subject ID 1002, the tracking information identification flag 403 into the tracking information identification flag 1003, and the main subject coordinate 404 into the main subject coordinate 1005.

In step S210, the controller 100 determines whether all the frames of the moving image data have been read. When the determination is affirmative, the controller 100 proceeds to step S910.

In step S910, the controller 100 records the data included in the tracking information management table stored in the volatile memory 103 as data of the tracking information management table recorded in the recording unit 101. The controller 100 writes the data (402 to 404) of the tracking information management table stored in the volatile memory 103 corresponding to the target frame number 401 of the main subject information to the data (1002, 1003, and 1005) of the tracking information management table stored in the recording unit 101 at a time of rewriting recording, for example. Thereafter, when the controller 100 completes the process, the series of operations is terminated.

Series of Operations of Tracking Information Correction Process

Figure 11A:
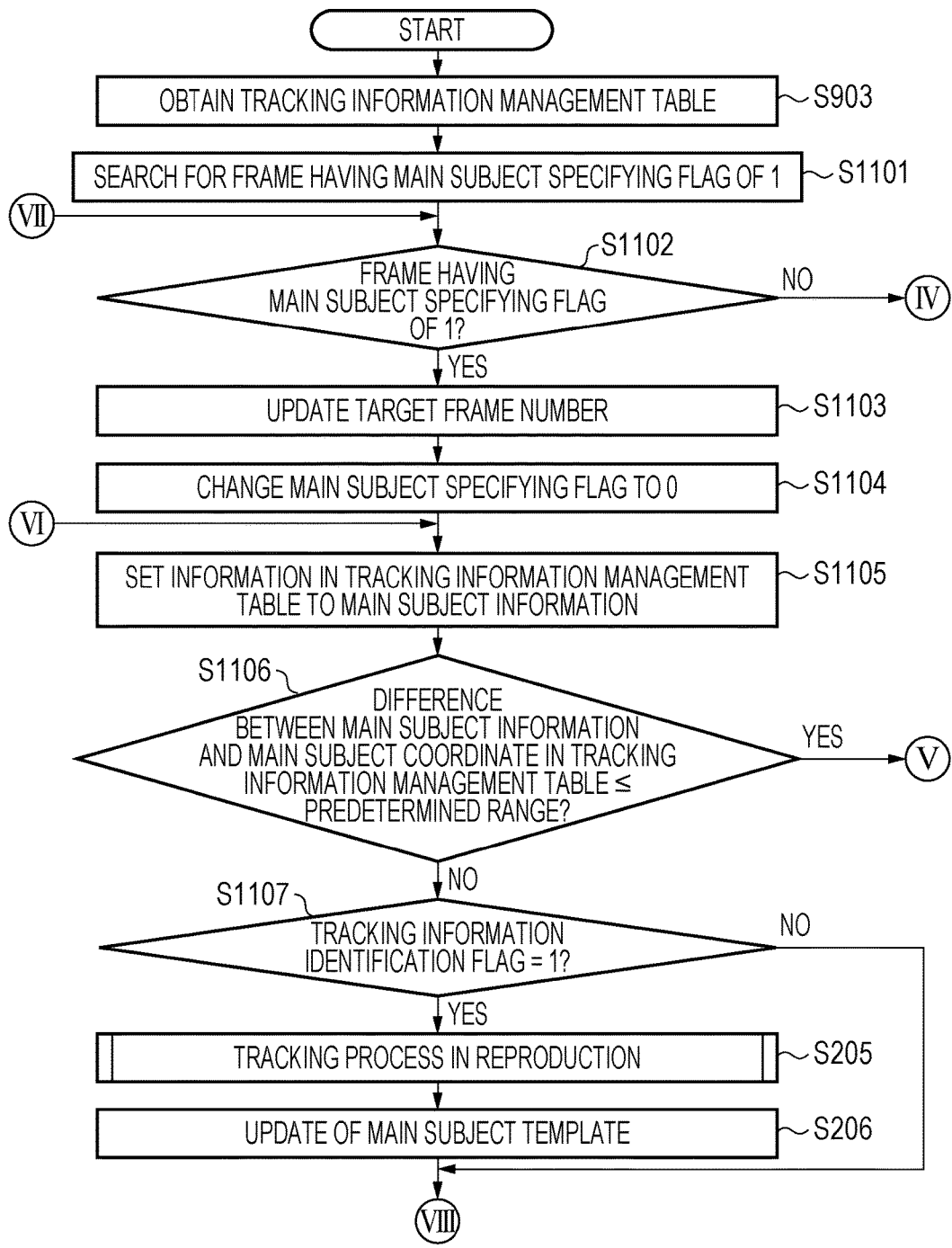
FIGS. 11A and 11B is a flowchart illustrating a series of operations of a tracking information correction process according to the embodiment.
Figure 11B:
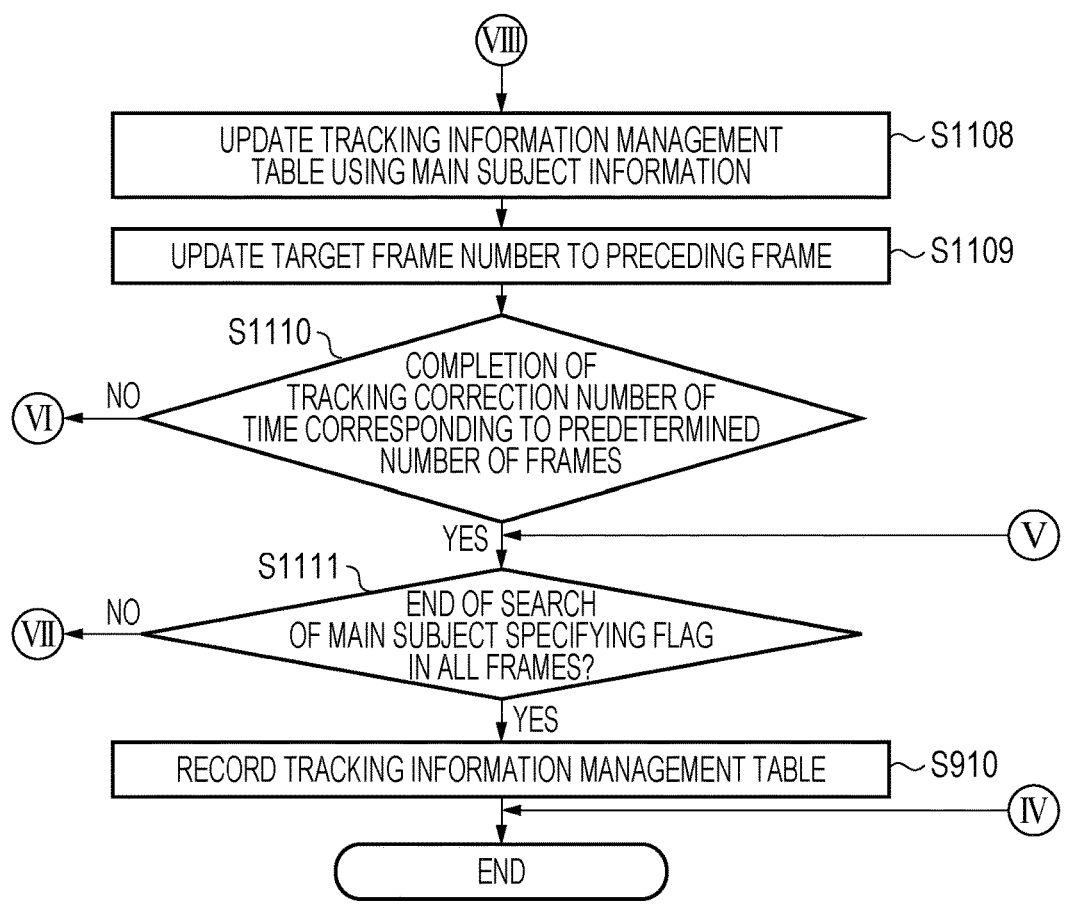

A series of operations of a tracking information correction process according to the present embodiment will be described with reference to FIGS. 11A and 11B. In the example described with reference to FIGS. 9A and 9B, the operation of the tracking reproduction process performed in accordance with the tracking information recorded in the tracking information management table in the tracking reproduction process performed for the second time onwards has been described. In an example of FIGS. 11A and 11B, tracking information obtained in a period of time in which a reproduction-time tracking process has not been performed, that is, a period of time from a frame in which a desired main subject has not been subjected to tracking reproduction to a frame in which a main subject is to be specified is corrected (which is referred to as a "tracking information correction process"). This process is executed when the controller 100 executes a control program stored in the volatile memory 103. As with the description with reference to FIGS. 9A and 9B, operations the same as those described above are denoted by reference numerals the same as those described above so that redundant descriptions are omitted.

In step S903, the controller 100 obtains the tracking information management table. In step S1101, the controller 100 searches the tracking information management table stored in the volatile memory 103 for a frame number corresponding to the main subject specifying flag 1004 of 1 from the top.

In step S1102, the controller 100 determines whether a frame having the main subject specifying flag of 1 exists in accordance with a result of the search in step S1101. When the determination is affirmative, the controller 100 proceeds to step S1103. When the determination is negative, the controller 100 terminates the series of operations.

In step S1103, the controller 100 sets the frame number detected in step S1102 to the target frame number 401 of the main subject information, and in step S1104, the controller 100 changes the main subject specifying flag 1004 of the tracking information management table corresponding to the detected frame number to 0.

In step S1105, the controller 100 sets the data (1002, 1003, and 1005) of the tracking information management table corresponding to the target frame number 401 of the main subject information to the data (402 to 404) of the main subject information, respectively. In a case where the tracking information identification flag 403 indicates that the coordinate of the subject is calculated "at a time of reproduction", a template for matching is generated using the main subject coordinate 404 and Expressions 1 to 4 and the template is set as the main subject template 405.

In step S1106, the controller 100 determines whether a difference between the main subject coordinate 404 of the main subject information or the subject coordinate 303 corresponding to the main subject ID 402 and the main subject coordinate 1005 of the tracking information management table or the subject coordinate 303 corresponding to the main subject ID 1002 is within a predetermined range. The controller 100 performs the determination using Expressions 5 and 6 while the main subject coordinate 404 of the main subject information or the subject coordinate 303 corresponding to the main subject ID 402 is denoted by "(PlayObjX, PlayObjY)" and the main subject coordinate 1005 of the tracking information management table or the subject coordinate 303 corresponding to the main subject ID 1002 is denoted by "(RecObjX, RecObjY)". When the determination is affirmative, the controller 100 proceeds to step S1111, otherwise, the controller 100 proceeds to step S1107.

In step S1107, the controller 100 determines whether the value of the tracking information identification flag 403 of the main subject information recorded in the volatile memory 103 is 1 indicating that the coordinate of the subject is calculated "in reproduction". When the determination is affirmative, the controller 100 proceeds to step S205 so as to perform the reproduction-time tracking process, otherwise, the controller 100 proceeds to step S1108. Thereafter, the controller 100 updates the main subject template 405 by performing the process in step S205 and step S206.

In step S1108, the controller 100 updates the data of the tracking information management table by the data of the main subject information. The controller 100 updates the data (1002, 1003, and 1005) of the tracking information management table by the data (402 to 404) of the main subject information stored in the volatile memory 103, for example.

In step S1109, the controller 100 changes the target frame number 401 of the main subject information stored in the volatile memory 103 to a preceding frame number. In step S1110, the controller 100 determines whether this process has been performed a number of times corresponding to the predetermined number of frames or more, that is, whether the reproduction tracking process has been performed a number of times corresponding to the predetermined number of frames. When the determination is affirmative, the controller 100 proceeds to step S1111 where the controller 100 further processes the frame having the main subject specifying flag of 1. When the determination is negative, the controller 100 returns to step S1105 where the controller 100 performs the reproduction-time tracking process again. The predetermined number of frames indicates an upper limit of the number of times the tracking information correction is performed, and assuming that the total number of frames of the moving image is denoted by "S", the predetermined number of frames T may be represented by Expression 21.

$$T = |S \times 0.01| \qquad \text{Expression 21}$$

In the present embodiment, the predetermined number of frames T is 1% of the total number of frames of the moving image.

In step S1111, the controller 100 determines whether all the tracking information identification flags 1003 included in the tracking information management table recorded in the volatile memory 103 have been subjected to the searching. When the determination is affirmative, the process proceeds to step S910. When the determination is negative, the process returns to step S1102.

In step S910, the controller 100 records the data included in the tracking information management table stored in the volatile memory 103 as data of the tracking information management table recorded in the recording unit 101. Thereafter, the controller 100 terminates the series of operations of this process.

Although the entire display area 804 and the tracking display area 805 are displayed in the same display unit 104 at the time of the tracking reproduction as illustrated in FIG. 8, the entire display area 804 and the tracking display area 805 can be output to be displayed in different devices, such as an external television set and a back surface liquid crystal display. In this case, a main subject is specified using a terminal which displays the entire display area 804.

Although Expressions 1 to 4 are used to determine a size of the main subject template in the present embodiment, a template size can be changed in accordance with a size of a main subject. In this case, a general subject detection process is performed before a template is generated, so that a size of the main subject is dynamically specified. Since the template size is changed in accordance with a size of the main subject, improved tracking performance is attained when a size of the main subject is changed.

According to the present embodiment, the range obtained in accordance with Expressions 7 to 10 is set as a search range when a similarity degree between a target region and the template is calculated in the reproduction-time tracking process. However, the search range can be changed in accordance with a movement amount of the subject. In this way, degradation of detection accuracy can be reduced when the movement amount of the subject is large.

According to the present embodiment, the tracking process is performed using the template information of the main subject. However, in a case where the main subject is a person, the tracking process can be performed on the person using a general person authentication technique. In the person authentication technique, a similarity degree between two face image data to be compared with each other, for example, is obtained in accordance with feature values of eyes, a nose, a mouth, and the like included in faces. When the similarity degree is high, it is determined that the two face images indicate the same person. In the case where the main subject is a person, the tracking process can be performed with higher accuracy since the person authentication technique is used.

As described above, according to the present embodiment, when the user specifies a main subject at a time of reproduction of moving image data, the reproduction-time tracking process or the tracking using the shooting-time tracking information is performed in accordance with the relationship between the specified main subject and the main subject included in the shooting-time tracking information. Thereafter, a display region that includes the tracked subject is displayed in the display unit 104. Here, in a case where a difference between a position of the specified main subject and a position of the main subject included in the shooting-time tracking information are within a predetermined range, the reproduction-time tracking process is not performed. By this, even in a case where a position (a coordinate) of the subject included in the shooting-time tracking information recorded in advance before reproduction is not appropriate, a moving image in which a desired subject is appropriately tracked can be reproduced. Then, in a state in which the shooting-time tracking information can be used, a processing resource at a time of reproduction can be reduced and degradation of a reproduction speed caused by a processing load at the time of moving image reproduction can be prevented.

Tracking information is separately recorded when the moving image data is reproduced, and the main subject is tracked using the recorded tracking information when the moving image data is reproduced again. By this, a reproduction process of tracking the main subject specified by the user once can be performed when the moving image data is reproduced again. In a period of time from a frame in which a desired main subject may not be tracked to when the user specifies the main subject, tracking information is generated and corrected when the moving image data is reproduced again. By this, a reproduction process of tracking the main subject desired by the user can also be performed in this period of time.

Second Embodiment

Next, a second embodiment will be described. In the first embodiment, both the entire region of the moving image frame and the tracking reproduction target region are displayed, for example, when the tracking reproduction process is performed. Such a display method is particularly effective when a panel included in the display unit 104 is comparatively large since the entire region of the moving image frame and the tracking reproduction target region are visually recognized at the same time. In the present embodiment, a display method employed in a case where a display panel included in a display unit 104 is comparatively small will be described. Specifically, in the present embodiment, a case where a tracking reproduction target region of a moving image frame is displayed when a tracking reproduction process is performed will be described. Although the reproduction-time tracking information is recorded as a file different from the shooting-time tracking information, for example, in the first embodiment, a case where shooting-time tracking information is partially rewritten and reused will be described in the present embodiment. A personal computer 10 of the present embodiment has a configuration the same as that of the first embodiment except that the display panel included in the display unit 104 is smaller. Therefore, the same configurations and the same steps are denoted by the same reference numerals, redundant descriptions are omitted, and different points are focused on.

User Interface of Tracking Reproduction Process

Figure 12:
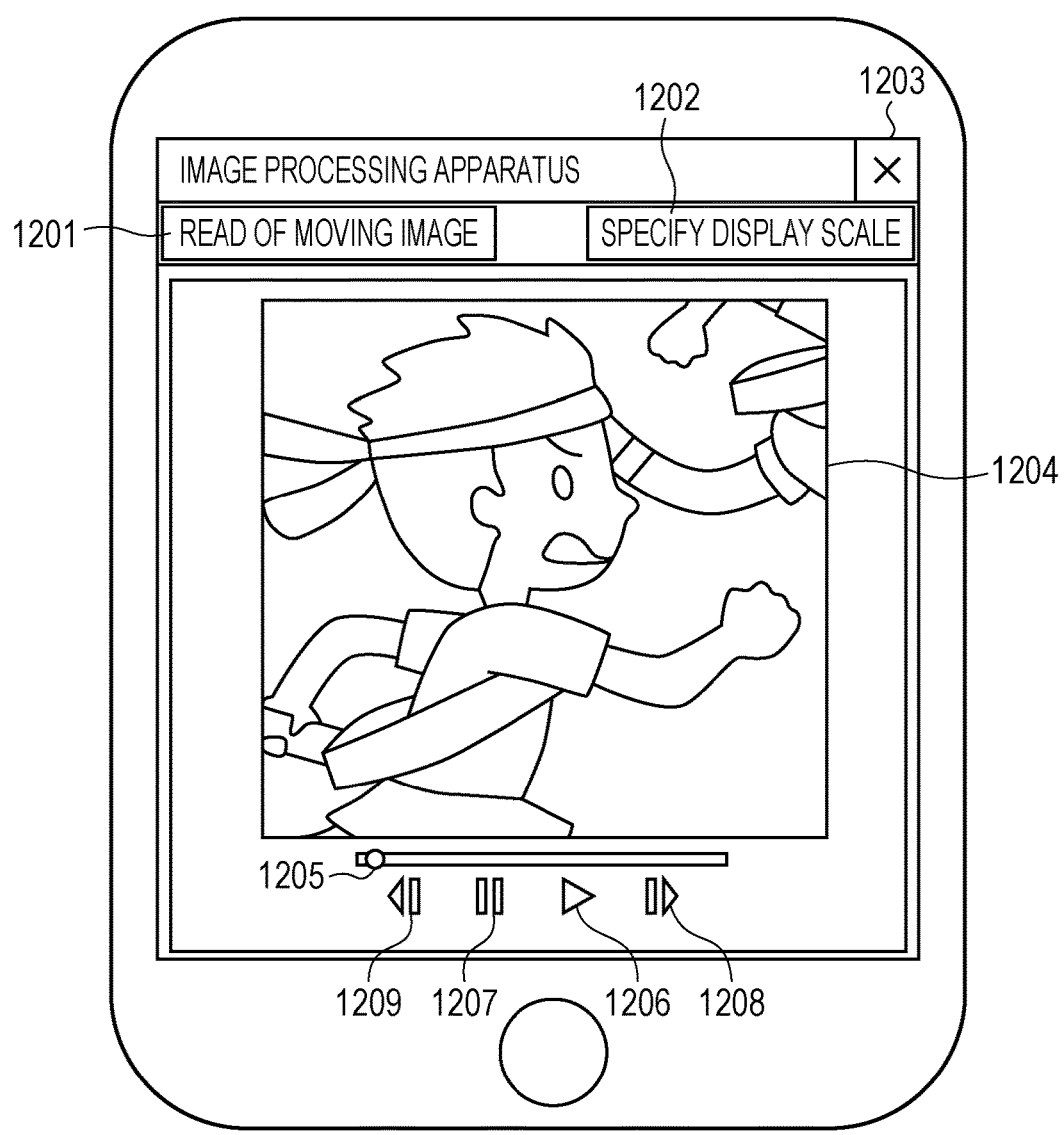
FIG. 12 is a diagram schematically illustrating a user interface in an input unit according to another embodiment.

An example of a user interface associated with the tracking reproduction process of the present embodiment will be described with reference to FIG. 12. A moving image reading button 1201 is used to start reading of a file of moving image data. When a user taps a moving image reading button 1201 on a touch panel included in an input unit 105, for example, a controller 100 determines that an instruction for reading moving image data has been issued and displays an open dialogue for opening the file of the moving image data. When the user selects the moving image data in the open dialogue, the controller 100 reads the selected moving image data from a recording unit 101 into a volatile memory 103 and displays the moving image data in a display unit 104.

A display scale specifying menu 1202 is used to specify a display scale of a predetermined region of a frame included in a moving image. When the user selects a scale of the display scale specifying menu 1202 using the touch panel, the controller 100 determines that a scale specifying instruction has been issued and displays a display scale list. Scales included in the display scale list can be the same as those in the display scale specifying list box 802 described above. The controller 100 stores the specified scale corresponding to a scale specified by the user in the volatile memory 103.

An end button 1203 is used to terminate reproduction of the moving image data. When the user presses the end button 1203 using the touch panel, the controller 100 determines that an end instruction has been issued and terminates reproduction of the moving image data.

A tracking display area 1204 displays a tracking reproduction target region in the frame of the moving image. When the user slides the tracking display area 1204 using the touch panel, the controller 100 determines that an operation of changing a tracking reproduction target region has been performed and slides the tracking reproduction target region in a direction opposite to a direction of the slide. When the user performs a pinch-in operation in the tracking display area 1204, the controller 100 determines that a scale-reduction operation has been performed and reduces a scale of the tracking reproduction target region by one step. When the user performs a pinch-out operation, the controller 100 determines that an enlargement operation has been performed and enlarges the scale of the tracking reproduction target region by one step. When the user touches the tracking display area 1204, the controller 100 determines that a main subject has been specified and stores a specified coordinate in the volatile memory 103.

A seeking bar 1205 is a member that accepts a tapping operation and a sliding operation. When the user presses or slides the seeking bar 1205, the controller 100 changes a reproduction position of the moving image data on a time axis. Reference numerals 1206 to 1209 are buttons that specify a method for reproducing the moving image data and a reproduction position. When the reproduction button 1206 is touched, the controller 100 starts tracking reproduction. When the pause button 1207 is touched, the controller 100 temporarily stops the tracking reproduction. When the frame feed button 1208 is touched, the controller 100 temporarily stops the tracking reproduction and displays a next frame in the tracking display area 1204. When the frame return button 1209 is touched, the controller 100 temporarily stops the tracking reproduction and displays a preceding frame in the tracking display area 1204.

Process of Partially Rewriting Shooting-Time Tracking Information in Reproduction Process Next, a process of partially rewriting the shooting-time tracking information in a series of operations of a reproduction process according to the present embodiment will be described with reference to FIG. 13. In the reproduction process illustrated in FIGS. 9A and 9B, the main subject information stored in the volatile memory 103 is recorded in the tracking information management table in step S909 taking the reproduction process performed for the second time onwards into consideration. However, in the present embodiment, the shooting-time tracking information recorded in a header of a moving image file of the recording unit 101 is partially rewritten using the main subject information stored in the volatile memory 103. This process is started instead of step S909 after the tracking reproduction process is performed in step S209.

In step S1301, the controller 100 obtains the main subject information stored in the volatile memory 103. In step S1302, the controller 100 determines whether a value of a tracking information identification flag 403 of the main subject information obtained in step S1301 is 1 indicating that the a coordinate of the subject is calculated "at a time of reproduction". When the determination is affirmative, the controller 100 proceeds to step S1303. When the determination is negative, the process proceeds to step S1305.

In step S1303, the controller 100 inserts data on a main subject ID to data on a target frame in the shooting-time tracking information included in the header of the moving image file recorded in the recording unit 101 so as to register a new subject. In step S1304, the controller 100 sets data on the tracking information identification flag 403 to the tracking information identification flag 1003 corresponding to the main subject ID newly registered in step S1303 and data on the main subject coordinate 404 to the main subject coordinate 1005.

In step S1305, the controller 100 changes a tracking priority 304 of the shooting-time tracking information stored in the recording unit 101 such that a priority level of the subject indicated by the main subject information becomes highest, and thereafter, this process is terminated.

As described above, according to the present embodiment, in a case where a size of the display panel of the display unit 104 is small, the moving image data is displayed only in the tracking display area 1204. The shooting-time tracking information recorded in the header of the moving image file of the recording unit 101 is partially written and recorded. By this, even if a moving image file is moved, the shooting-time tracking information and the reproduction-time tracking information may not be lost, and a reproduction process of tracking a subject desired by the user can be performed.

Other Embodiments

Embodiments of the invention can be realized by a process of supplying programs that realize at least one of the functions of the foregoing embodiments to a system or an apparatus through a network or a storage medium and reading and executing the programs using at least one processor of a computer included in the system or the apparatus. Furthermore, the present invention can be realized by a circuit (an ASIC, for example) which realizes at least one of the functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225087, filed in Nov. 17, 2015, which is hereby incorporated by reference herein in its entirety.

What is claimed is:

1. An image reproduction apparatus comprising:
   a processor; and
   a memory configured to store instructions that when executed by the processor cause the processor to:
   obtain a captured moving image and information associated with the moving image, the information indicating a position of a first subject in individual frame images of the moving image;
   detect a position of a second subject specified as a tracking target in the individual frame images of the moving image by performing a tracking processing in the individual frame images of the moving image;
   determine whether a difference between the position of the second subject detected by performing the tracking process and the position of the first subject indicated by the information, in the individual frame images, is within a predetermined range; and
   control a display region of the moving image to be displayed based on the position of the first subject indicated by the information in a frame image in which the difference is within the predetermined range, and control a display region of the moving image to be displayed based on the position of the second subject detected by performing tracking process in a frame image in which the difference is not within the predetermined range when the moving image is reproduced.

2. The image reproduction apparatus according to claim 1, wherein the instructions, when executed by the processor, further cause the processor to not perform the tracking process in a case where the difference between the position of the second subject specified as the tracking target and the position of the first subject, in a frame image in which the tracking target is specified, is within the predetermined range.

3. The image reproduction apparatus according to claim 1, further comprising:
   a display,
   wherein the the instruction, when instructed by the processor, further cause the processor to control such that the display region is displayed in the display and is included in a frame of the moving image as a part of the frame.

4. The image reproduction apparatus according to claim 3, wherein the display displays an entire frame of the moving image.

5. The image reproduction apparatus according to claim 1, wherein the information is obtained from a header of the moving image.

6. The image reproduction apparatus according to claim 1, further comprising another memory that records information indicating the second position of the subject.

7. The image reproduction apparatus according to claim 6, wherein the information indicating the position of the second subject is recorded in the another memory in a file different from a file of the moving image.

8. The image reproduction apparatus according to claim 6, wherein the information indicating the position of the second subject is recorded in the another memory by partially rewriting a header of a file of the moving image.

9. The image reproduction apparatus according to claim 6, wherein the instructions, when executed by the processor, further cause the processor to perform, in a case where the information indicating the position of the second subject is recorded in the another memory, the tracking process with the information indicating the position of the second subject recorded in the another memory.

10. A method for controlling an image reproduction apparatus comprising:
    obtaining a captured moving image and information associated with the moving image, the information indicating a position of a first subject in for individual frame images of the moving image;

detecting a position of a second subject specified as a tracking target in the individual frame images of the moving image by performing a tracking process in the individual frame images of the moving image;

determining whether a difference between the position of the second subject detected by performing the tracking process and the position of the first subject indicated by the information, in the individual frame images, is within a predetermined range; and controlling a display region of the moving image to be displayed based on the position of the first subject indicated by the information in a frame image in which the difference is within the predetermined range; and controlling a display region of the moving image to be displayed based on the position of the second subject detected by performing the tracking process in a frame image in which the difference is not within the predetermined range when the moving image is reproduced.

11. The method according to claim 10, wherein the tracking is not performed in a case where the difference between the position of the second subject specified as the tracking target and the position of the first subject in a frame image in which the tracking target is specified is within the predetermined range.

12. The method according to claim 10, wherein the display region is displayed in a display and is included in a frame of the moving image as a part of the frame.

13. The method according to claim 12, wherein an an entire frame of the moving image is displayed.

14. The method according to claim 10, wherein the information is obtained from a header of the moving image.

15. The method according to claim 10, further comprising recording the information indicating the position of the second subject.

16. The method according to claim 15, wherein the information indicating the position of the second subject is recorded in a file different from a file of the moving image.

17. The method according to claim 15, wherein the information indicating the position of the second subject is recorded by partially rewriting a header of a file of the moving image.

18. The method according to claim 15, further comprising performing, in a case where the information indicating the position of the second is recorded in the another memory, the tracking process with the information indicating the position of the second subject recorded in the another memory.

19. A non-transitory computer readable storage medium that stores computer executable instructions that cause a computer to execute a method for controlling an image reproduction apparatus, the method comprising:

obtaining a captured moving image for and information associated with the moving image, the information indicating a position of a first subject in individual frame images of the moving image;

detecting a position of a second subject specified as a tracking target in the individual frame images of the moving image by performing a tracking process in the individual frame images of the moving image;

determining whether a difference between the position of the second subject detected by performing the tracking process and the position of the first subject indicated by the information, in the individual frame images, is within a predetermined range; and controlling a display region of the moving image to be displayed based on the position of the position of the first subject indicated by the information in a frame image in which the difference is within the predetermined range; and controlling a display region of the moving image to be displayed based on the position of the second subject detected by performing the tracking process in a frame image in which the difference is not within the predetermined range when the moving image is reproduced.

* * * * *